Aug. 14, 1962    H. C. HADLEY    3,049,127
CORN HUSKER
Original Filed Sept. 11, 1957    3 Sheets-Sheet 1

INVENTOR.
HOWARD C. HADLEY
ATTORNEYS

Aug. 14, 1962  H. C. HADLEY  3,049,127
CORN HUSKER
Original Filed Sept. 11, 1957  3 Sheets-Sheet 2
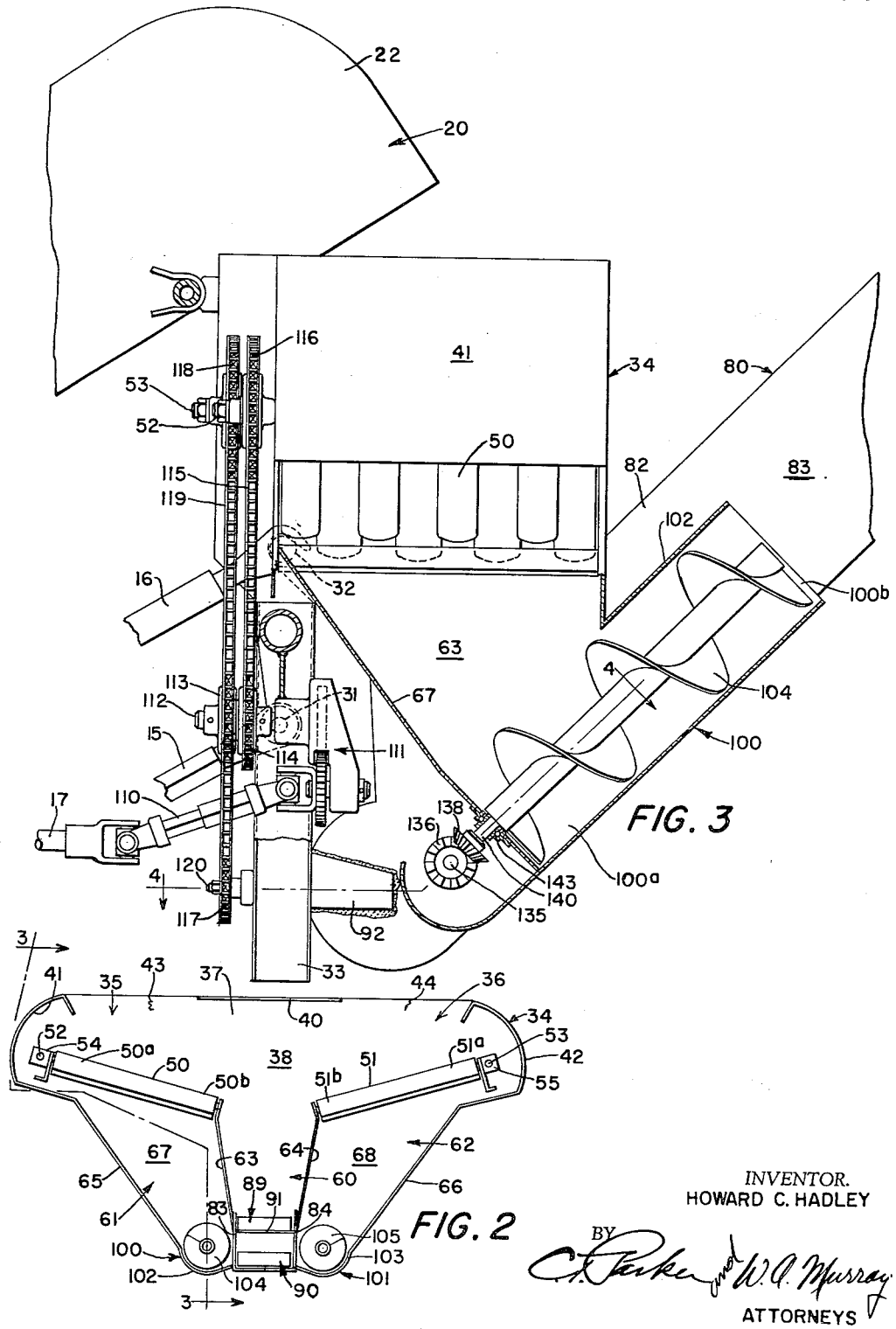
INVENTOR.
HOWARD C. HADLEY
ATTORNEYS

INVENTOR.
HOWARD C. HADLEY
ATTORNEYS 3,049,127
CORN HUSKER
Howard C. Hadley, Des Moines, Iowa, assignor, by mesne assignments, to Deere & Company, Moline, Ill., a corporation of Delaware
Continuation of application Ser. No. 683,302, Sept. 11, 1957. This application Nov. 19, 1959, Ser. No. 854,199
6 Claims. (Cl. 130—5)

This invention relates to a corn harvester and more particularly to the corn husking unit incorporated in the harvester. Still more particularly the invention relates to discharge conveyor means on the harvester for removing trash and the ears of corn.

This is a continuation of a previously filed application, Serial No. 683,302, filed September 11, 1957, and now abandoned.

A corn harvester normally comprises a mobile frame having means at the forward end for detaching the ears of corn from standing stalks. The ears are normally fed rearwardly to a crop treating unit, in most cases a husking unit, in husk covered condition. The crop treating or husking mechanism conventionally comprises one or more pair of cooperating husking rolls which operate to grasp the husks from the ears and to drive them downwardly beneath the husking mechanism. In the past it has been the normal procedure to provide an auger type conveyor running parallel to the husking rolls which feed the husks outwardly from the harvester.

In the type of corn harvester, herein to be described, the mobile frame is in the form of a tractor body and includes a pair of row or harvester units on opposite sides of the body which feed harvested ears of corn to a transverse husking unit at the rear of the tractor. The husking unit includes a pair of elongated and longitudinally alined husking assemblies which receive the ears of corn adjacent the outer ends of the husking assemblies and feed them inwardly to a centrally located discharge end. In the past the husking discharge augers or conveyers normally receive the husks and drive them outwardly relative to the longitudinal center line of the tractor and harvester assembly, there to be discharged on the ground. It is contemplated and it is the object of the present invention to provide a husk discharge auger means which is positioned transverse to the husking rolls and which feeds the husks transversely relative to the longitudinal dimension of the husking rolls. Panel or hopper means will be positioned under the husking rolls to feed the husks to one end of the auger means.

It is also an object of this invention to provide in the above described type of husking mechanism, centrally located discharge conveyor means which includes a centrally located wagon elevator which receives the ears of corn from the husking rolls, and a pair of rigidly connected husking auger assemblies on opposite sides of the wagon elevator which receive the husks from the husking mechanism and also feeds the husks rearwardly. This latter feature will offer two advantages over that of the conventional type corn harvester in that first, it will discharge the husks at a point rearwardly of the harvesting and husking mechanisms so as to reduce the tendency of the trash to remain in the vicinity of the tractor and the tractor operator and second, it will permit the husks to be discharged centrally relative to the tractor and harvester so that the husks or waste will not normally flow over to the next adjacent pair of rows of stalks that the harvester will pass over. Trash will, therefore, not normally be passed through the corn harvester units a second time when they pass over the adjacent rows.

While the present invention will be shown and described with a transverse husking mechanism positioned at the rear of the tractor, it should be understood that there are inherent advantages in providing panel or hopper means under any type of husking mechanism or crop treating mechanism which feeds the husks to a discharge conveyor transverse to the husking mechanism. Such a system could be utilized in any type of harvester so as to discharge the waste material at a preferred location to avoid various parts of the harvester or to discharge the material at a location more feasible in the operation of the harvester.

Other objects and advantages of the present invention will become apparent to those skilled in the art as the nature of the invention is better understood from the following detailed description and as shown in the accompanying drawings.

FIG. 2 is a vertical sectional schematic view taken substantially along the line 2—2 of FIG. 1.

FIG. 3 is a sectional view taken substantially along the line 3—3 of FIG. 2.

Figure 1:
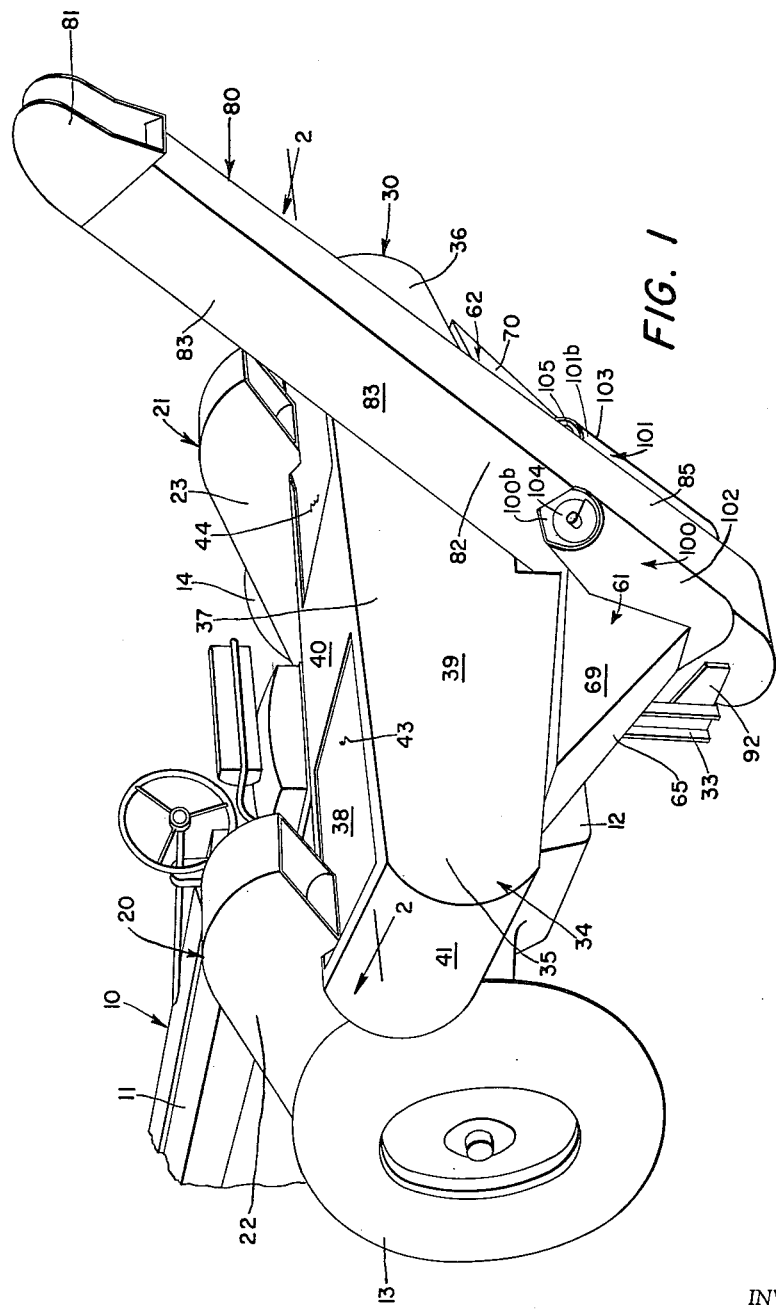
FIG. 1 is a rear perspective view of the rear portion of a tractor and corn harvester assembly.

The harvester assembly herein to be described includes a tractor 10 having an elongated body 11, an axle and transmission assembly 12, a pair of front supporting wheels, not shown, and rear wheels 13, 14. Other details of the tractor, such as the draft type linkage indicated in FIG. 3 by lower parallel links 15, the left link only being shown, and an upper link 16, and a power take-off shaft 17, are shown only partially.

The harvester includes a pair of forwardly extending harvester row units 20, 21 positioned on opposite sides of the tractor body 11 and between the tractor body 11 and the respective left and right rear wheels 13, 14. The row units 20, 21 contain therein means for aggressively detaching the ears of corn from the stalks and corn elevator portions, indicated in their entirety by reference numerals 22, 23 respectively, which feed the ears of corn rearwardly to be discharged. The harvester row units are more or less conventional and may be similar to those shown and described in assignee's application, Serial No. 666,670 filed June 19, 1957, now Patent No. 2,958,993.

Positioned beneath the discharge ends of the elevators 22, 23 is the husking mechanism indicated in its entirety by the reference numeral 30. The husking mechanism is mounted on the tractor links 15, 16 by means of horizontal pivot shafts 31, 32 which are part of a main frame 33. The exact details of the frame 33 are unimportant for purposes of this invention and are described only generally and for purposes of orientation. A more detailed explanation, if desired, may be had by reference to the aforementioned U.S. Patent 2,958,993. The husking mechanism is comprised of a housing structure 34 which is rigid with the main frame 33, or may be treated as a part thereof. The housing structure 34 is positioned to the rear of the row units 20, 21 and has outer end portions 35, 36 adjacent to and for receiving ears of corn from the discharge ends 22, 23, respectively, of the row units. A central portion 37 of the housing structure is positioned inwardly of the outer end portions 35, 36 and directly to the rear of the tractor body 11. The housing structure 34 is composed of front and rear transverse vertically disposed panels 38, 39 interconnected by an upper central and horizontal panel 40 and curved end panels 41, 42. As may be seen from FIG. 2, the end panels 38, 39 are spaced transversely from the central panel 40 to form ear-receiving openings 43, 44 adjacent and proximate to the discharge ends of the elevators 22, 23.

Positioned inwardly of the housing structure 34 is a pair of inclined husking units 50, 51. The husking units 50, 51 have crop receiving ends 50a and 51a respectively adjacent respective end portions 35, 36 of the housing structure and beneath the ear receiving openings 43, 44 respectively. The husking units 50, 51 are inclined to feed ears of corn inwardly to discharge ends 50b and 51b. The discharge ends 50b and 51b are proximate to one another and are spaced apart transversely to permit the ears of corn to be fed over the ends 50b and 51b in a substantially single stream of corn at the central portion 37 of the housing structure. Adjacent the crop receiving ends 50a and 51a are drive mechanisms 54, 55 respectively which consists of elongated fore-and-aft extending gear housings which house suitable series of bevel gears, not shown, part of which are mounted on drive shafts 52, 53, which mesh with bevel gears, also not shown, which are mounted on and drive the individual husking rolls making up the husking units 50, 51. Husking units 50, 51 and their associated drives 54, 55 are generally conventional, such being shown, for example, in the aforementioned U.S. Patent 2,958,993. Consequently, while details of the husking units and their associated gear drives have not been shown or described in detail, if such is desired reference may be had to that patent.

Positioned beneath the husking units 50, 51 are a series of three hoppers including a central corn hopper 60 and two outer husk hoppers 61, 62 adjacent to and on opposite sides of the central hopper 60. The hoppers 60–62 are formed by transversely spaced panel means 63, 64, which form the inner sides of the outer hoppers 61, 62 and separate them from the central hopper 60 and outer inclined panels 65, 66, which are part of the housing structure 34 and which extend downwardly and inwardly from an upper end adjacent to the lower edge of the curved end panels 41, 42. Other panel means forming the hoppers 61, 62 are front panels 67, 68 at the forward sides of the end hoppers 61, 62 respectively and rear panels 69, 70 at the rear of the hoppers. The central hopper 60 is formed, as previously mentioned, by the panels 63, 64 at its sides and a lower continuation of the forward panel 38 and its forward side.

Positioned beneath the central hopper 60 and for re-receiving the ears of corn issuing over the discharge ends 50b, 51b of the husking units 50, 51 is the lower end of a wagon elevator 80. The wagon elevator 80 is of a conventional flight type, which moves the ears of corn upwardly and rearwardly to a discharge end 81. The wagon elevator 80 includes an elevator housing 82 which is rigidly connected to the housing structure by means of rearwardly extending brackets 92, 93 of the main frame 33. The elevator housing includes sidewalls 83, 84 interconnected at their lower edges by a lower wall 85 and at their upper edges by an upper wall, not shown. The elevator further includes a conventional type flight chain 86 having fore-and-aft spaced apart flights 87 which is mounted to drive over a drive sprocket 88 and includes an upper discharge run 89 and a lower return run 90, the upper run 89 moving over a transverse support panel 91.

Adjacent to and on opposite sides of the corn elevator 80 are a pair of fore-and-aft extending auger conveyors 100, 101. As shown in FIG. 2, the augers are positioned at the discharge portion of the outer hoppers 61, 62 and receive at their forward ends the husks being discharged through the husking units 50, 51 respectively. Auger housings 102, 103 are rigid with the wagon elevator 80 and may be welded or in any other manner fixed to the panels 83, 84. The auger housings 102, 103 contain augers 104, 105 respectively, the purpose of which is to move the husks rearwardly from the inlet or lower ends 100a, 101a of the conveyors to be discharged clear of and in a rearward direction from the outlet or upper ends 100b, 101b of the conveyors.

Power for the husking mechanism is obtained directly from the power take-off shaft 17 by means of a drive which includes a rearwardly extending drive shaft 110 which is connected at its rear end to a gear transmission indicated in its entirety by the reference number 111 which transmits the power to a forwardly projecting drive shaft 112. Mounted on the drive shaft 112 are a pair of pinion sprockets 113, 114. The rear sprocket 114 drives the left husking unit 50 by means of a chain 115 which extends upwardly to a drive sprocket 116 fixed to the husking unit drive shaft 52. The forward pinion sprocket 113 serves to drive a lower sprocket 117 and an upper drive sprocket 118, the latter being fixed to the husk unit drive shaft 53. Both of the sprockets 117 and 118 are driven by an agricultural type link chain 119.

Figure 4:
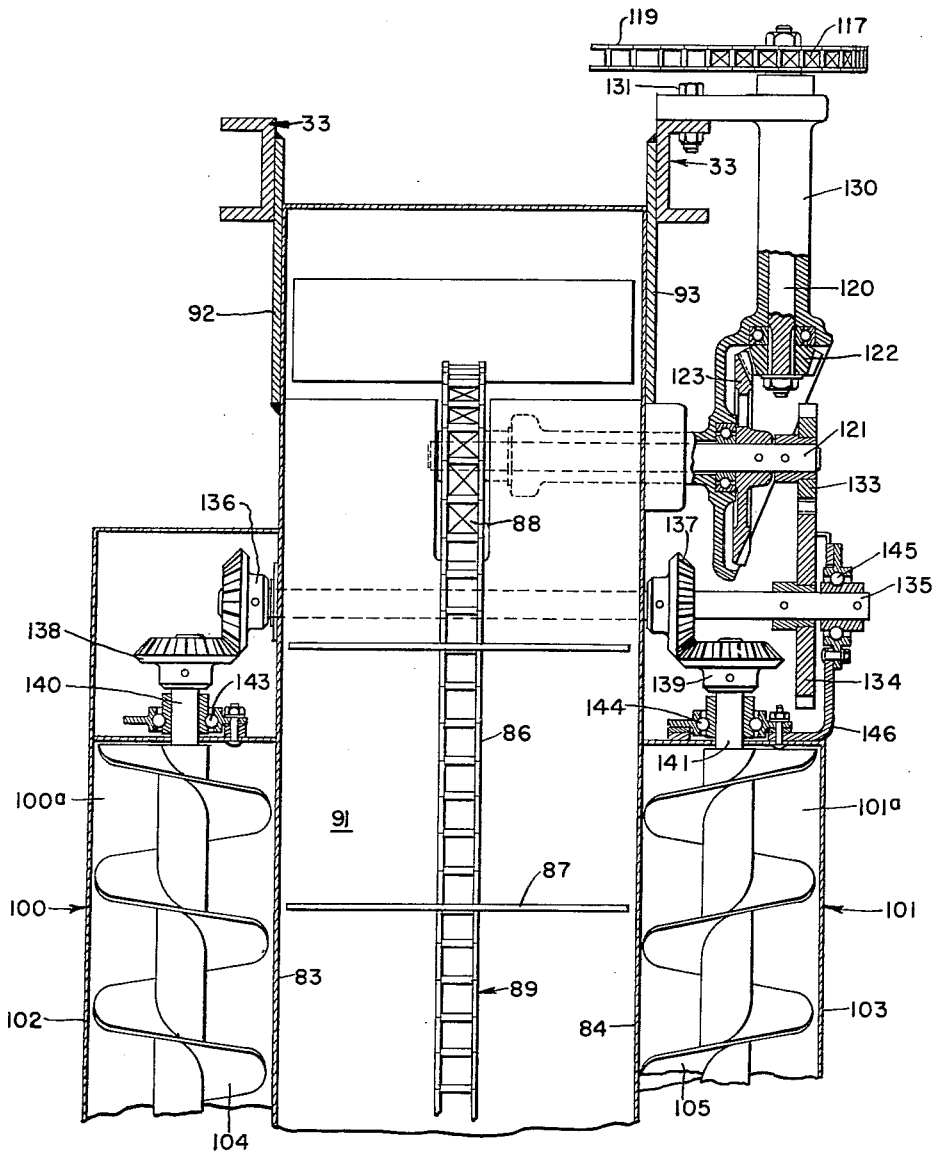
FIG. 4 is a sectional view taken substantially along the line 4—4 of FIG. 3.

Referring now to FIG. 4, the drive for the three conveyors or elevators 80, 100, and 101, is provided from the drive sprocket 117 which is fixed to a fore-and-aft extending shaft 120. The shaft 120 drives a transverse wagon elevator drive shaft 121 by means of a bevel pinion 122, and gear 123. The shafts 120, 121 are supported by a journal casting 130 which is bolted to the main frame 33 as indicated at 131. On one end of the shaft 121 is mounted the chain sprocket 88 which drives the chain conveyor 86 in the wagon elevator. On the opposite end of the shaft 121 is mounted a pinion 133 which meshes with a gear 134 pinned to a transverse drive shaft 135 which extends through and is supported by the side plates 83, 84. Adjacent to the side plates 83, 84 and mounted on the shaft 135 is a pair of bevel pinions 136, 137 respectively which mesh with respective bevel gears 138, 139 respectively which are fixed to auger drive shafts 140, 141. The shafts 140, 141 are journaled at the lower end of the auger housings 102, 103 by bearings 143, 144. The drive shaft 135 is further supported for rotation on the lower end of the right auger housing 103 by means of a bearing 145 carried by a bracket 146 fixed to the lower end of the conveyor housing 103.

In operation the present husking mechanism will operate in the following manner. As the corn is discharged from the row units 20, 21 it will be received on the outer ends 50a, 51a of the husking units 50, 51 from where it will be fed inwardly, due to the inclination of the husking units 50, 51, to be discharged over the inner or discharge ends 50b, 51b of the husking units. Each of the husking units, in conventional manner, will operate to discharge downwardly husks resulting from the husking operation from where the husks will be gathered by the hoppers 67, 68 to be fed inwardly and downwardly to the central portion 37 of the housing structure to be discharged into the husk conveyors 100, 101. At the same time that the husks are being fed inwardly to the husk conveyors 100, 101, the ears of corn will be collected in the central hopper 60 and will move onto the upper flight 89 from where it will be moved upwardly and rearwardly to an awaiting wagon or similar conveyor. The husks will be discharged from the rear end of the husk augers 100, 101 and will be free to be scattered over the ground directly to the rear of the harvester.

While only one form of the invention has been shown, it should be recognized that other forms and variations could exist without departing basically from the broad general principles herein described. It should therefore be understood that while the preferred form of the invention was disclosed with the view of clearly and concisely illustrating its principles, it is desired not to so limit the invention beyond that which is broadly claimed.

What is claimed is:

1. A corn husking unit including a pair of elongated husking mechanisms alined longitudinally and operative to remove husks from corn ears, each of the husking mechanisms having respective ends in proximate and spacial relation to the discharge end of the other husking mechanism, and each of the husking mechanisms being operative to feed the ears to its discharge end; a corn elevator transverse to the husking mechanism and positioned beneath the discharge ends for receiving ears from the husking mechanisms and including therein an elongated elevator housing structure with a corn discharge end spaced from the husking mechanisms; a pair of conveyor housings transverse to the husking mechanisms rigid with and positioned alongside and on opposite sides respectively of the elevator housing structure and having discharge outlets remote from the husking mechanisms and terminating short of the elevator discharge end; conveyor means within the conveyor housings operative to move material transversely relative to the husking mechanisms; and hopper means beneath each of the respective pair of husking mechanisms receiving husks from the husking mechanisms and feeding them to the respective conveyor means.

2. A corn husking unit including an elongated husking mechanism having an intake portion and a discharge portion and operative to remove husks from corn ears and to feed the ears from the intake to the discharge portion; a corn elevator transverse to the husking mechanism and positioned beneath the discharge portion for receiving ears therefrom and including therein an elongated elevator housing projecting to a discharge end remote from the husking mechanism; an elongated conveyor housing transverse to and adjacent the discharge portion of the husking mechanism, said conveyor housing being rigid with, parallel to, and alongside the elevator housing and terminating at a discharge end remote from the husking mechanism, said latter discharge end terminating short of the elevator discharge end; conveyor means within the conveyor housing operative to move material transversely relative to the husking mechanism; and hopper means beneath the husking mechanism receiving husks therefrom and feeding them into the conveyor housing.

3. Corn husking mechanism comprising: housing structure having opposite end portions and a central portion; a pair of elongated husking units mounted on the structure and extending respectively from the opposite end portions to the central portion, each of the husking units having a crop-receiving end adjacent its respective end portion and a crop discharge end adjacent the central portion, and each of the husking units being operative to discharge downwardly husks resulting from the husking operation and to feed ears of corn from its crop-receiving end to its discharge end and in a stream over the discharge end; panel means in said housing structure forming a central hopper and a pair of outer hoppers adjacent opposite sides of the central hopper and beneath the husking units, the central hopper opening upwardly to receive the ears leaving the discharge ends of the husking units and the outer hoppers opening upwardly to receive husks from the husking units and operative to feed the husks inwardly toward the central portion of the housing structure; and discharge means connected to the housing structure adjacent its central portion including parallel, adjacent, and rigidly connected elongated outer auger housings and a central conveyor housing disposed transversely relative to the husking units having material inlets opening into and for receiving material from the outer and central hoppers respectively and material outlets remote from the inlets, auger means within the auger housings for moving the husks from the inlets to the outlets, and a conveyor within the central conveyor housing for moving the ears from the inlet to the outlet.

4. Corn treating mechanism for use with a tractor mounted corn harvester, the tractor having a central fore-and-aft extending body and the harvester having a pair of row units on opposite sides of the body discharging ears of corn rearwardly of the tractor, the corn treating mechanism comprising: transverse housing structure having opposite end portions receiving ears from the row units and a central portion; a pair of elongated corn treating units mounted on the structure and extending respectively from the opposite end portions to the central portion, each of the treating units having a crop-receiving end adjacent its respective end portion and a crop discharge end adjacent the central portion, and each of the treating units being operative to discharge downwardly trash resulting from the treating operation and to feed corn from its crop-receiving end to its discharge end and in a stream over the discharge end; panel means in said housing structure forming a central hopper and a pair of outer hoppers adjacent opposite sides of the central hopper and beneath the treating units, the central hopper opening upwardly to receive the corn from the discharge ends of the treating units and the outer hoppers opening upwardly to receive trash from the treating units and operative to feed the trash inwardly toward the central portion of the housing structure; and discharge means connected to the housing structure adjacent its central portion including parallel rearwardly extending, adjacent, and rigidly connected elongated conveyors, said conveyors having material inlets opening into and for receiving material from the central and outer hoppers respectively and material outlets remote from the inlets.

5. The invention defined in claim 4, further characterized by said conveyors being in side-by-side relation and having common wall means therebetween.

6. Corn treating mechanism comprising: housing structure; an elongated crop treating unit mounted on the structure having a crop-receiving end and a crop discharge end and operative to discharge downwardly trash resulting from the treating operation and to feed the treated crop downwardly from its discharge end; panel means below the housing structure defining a pair of adjacent hoppers, one hopper opening upwardly to receive the treated crop and the other hopper opening upwardly to receive the trash; a pair of adjacent rigidly connected elongated and parallel conveyor troughs having a common wall and having at one of their ends material receiving inlets opening into and for receiving material from the hoppers respectively and extending upwardly and outwardly relative to their respective inlet ends to outlet ends, the trough receiving the trash terminating short of the trough receiving the treated crop whereby its outlet may discharge trash considerably inwardly and downwardly as respects the area of discharge of the outlet of the trough receiving the treated crop; and conveyor means in the troughs for moving the trash and treated crop to the respective outlet ends.

References Cited in the file of this patent

UNITED STATES PATENTS

| | | |
|---|---|---|
| 1,041,070 | Hamacher | Oct. 15, 1912 |
| 1,771,027 | Bradley et al. | July 22, 1930 |
| 2,379,802 | Hyman | July 3, 1945 |

UNITED STATES PATENT OFFICE
CERTIFICATE OF CORRECTION

August 14, 1962

Patent No. 3,049,127

Howard C. Hadley

It is hereby certified that error appears in the above numbered patent requiring correction and that the said Letters Patent should read as corrected below.

Column 6, line 35, for "Corn" read -- Crop --.

Signed and sealed this 26th day of March 1963.

(SEAL)
Attest:

ESTON G. JOHNSON
Attesting Officer

DAVID L. LADD
Commissioner of Patents